UNITED STATES PATENT OFFICE.

CLEAVELAND F. DUNDERDALE, OF BROOKLYN, NEW YORK.

IMPROVEMENT IN COMPOSITIONS FOR MAKING HYDRAULIC CEMENT.

Specification forming part of Letters Patent No. 195,749, dated October 2, 1877; application filed May 3, 1875.

*To all whom it may concern:*

Be it known that I, CLEAVELAND F. DUNDERDALE, of the city of Brooklyn, county of Kings, and State of New York, have invented a Composition for Making Hydraulic Cement, of which the following is a specification:

The nature of the invention consists in the artificial admixture of two or more clays or marls, or infusorial silica, and a clay or marl, with lime or the carbonate thereof.

I use, by preference, a mixture of an aluminous marl with a calcareous marl, or a fusible clay with a refractory clay, or an aluminous or calcareous marl with a fusible or a refractory clay, or a clay rich in silica in the finely-divided state with a clay rich in alumina, or infusorial silica with any silicate of alumina, in combination with lime in the desired proportions, either in the form of quicklime or the carbonate thereof. Among the clays rich in silica may be named fire-clay, potter's clay, slip (glazing) clay, as well as infusorial silica, and among the clays rich in alumina may be named haloisite, kaolin, the blue, red, and brown (common red brick) clays.

The refractory (fire-proof) or fusible character of a clay is determined by the quantity of iron oxides and lime, either or both, that may be contained in their composition. The larger amount of both or either, within limits, especially the iron oxides, present, the more easily fusible will be the clay.

I find, in practice, that an easily-fusible clay mixed with a refractory one, and both with lime, or the carbonate thereof, when burned at the white heat, essential to make a true hydraulic cement, produce a better result, owing probably to the presence of the iron in the mixture, which facilitates the combination of the lime, alumina, and silica with each other, as well as with it, into the double silicates of lime and alumina.

To prepare the cement, take of a fusible clay, as potter's clay, which contains, by analysis, about, of silica, sixty-one per cent.; alumina, twenty-four per cent.; oxides of iron, seven and a half per cent.; and lime, one-half of one per cent., say, two parts, by weight; and of a refractory clay, as haloisite, which contains, by analysis, about, of silica, forty-three and a half per cent., and alumina, thirty-two and a half per cent., (the remainder being mostly water,) say, one part by weight, with about five and three-quarters parts, by weight, of quick or caustic lime, or ten parts of the carbonate thereof. These should be thoroughly ground and mixed together, which can be best done in a "wash-mill" with water, after which the water should be removed by drying, and the mixture burned at a white heat for several hours, until it reaches the semi-vitrified state, which may be done in any one of the improved forms of kilns, after which it should be ground into a fine powder, when it is ready for use.

The object of using two or more clays or marls, or a clay and a marl, or a clay or a marl with infusorial silica, the clays or marls each being of a different character, with lime or the carbonate thereof, is to obtain the requisite quantity, in the proper form, of silica, alumina, oxides of iron, and lime, to secure the proper chemical combination in the right proportions of the different ingredients during the time it is subjected to the white heat in the kiln, and the formation of the double silicates of alumina and lime.

In using infusorial silica instead of one of the aforesaid clays or marls, as might be selected with regard to the proportions of silica, alumina, and iron oxides or lime contained in their individual composition, to form, when mixed, the proper proportions of the several aforesaid ingredients, I select a clay, as the common red or brown (red brick) clay, which has the analysis, about, of silica, forty-nine and a half per cent.; alumina, thirty-four and one-quarter per cent.; protoxide of iron, eight per cent.; lime, one and one-half per cent.; magnesia, five and one-seventh per cent.; and water, two per cent., and mix therewith, or add thereto, the infusorial silica in sufficient quantity to bring the proportions of silica to from two to two and a half times that of the alumina; and to every one part of this mixture I add one and three-fourths part, by weight, of lime, or the carbonate thereof, or more, as may be found desirable. These are then thoroughly ground and incorporated together, preferably in water; then burned and again ground, as before mentioned.

These proportions can be varied without serious injury resulting to the cement. Therefore I do not confine myself to the exact proportions herein mentioned; but

What I claim, and desire to secure by Letters Patent of the United States, is—

1. In a composition for making hydraulic cement, the combination of a refractory clay rich in alumina, and a fusible clay rich in silicic acid, with lime or its carbonate, for the purpose herein set forth.

2. A composition for making hydraulic cement, consisting of the artificial admixture of infusorial silica and a silicate of alumina with lime or the carbonate thereof, for the purpose as herein set forth and described.

CLEAVELAND F. DUNDERDALE.

Witnesses:
 FRANKLIN A. LE VERE,
 SOUTHARD HOFFMAN.